(12) United States Patent
Bhatti et al.

(10) Patent No.: US 6,304,906 B1
(45) Date of Patent: Oct. 16, 2001

(54) METHOD AND SYSTEMS FOR ALLOWING DATA SERVICE SYSTEM TO PROVIDE CLASS-BASED SERVICES TO ITS USERS

(75) Inventors: Nina T. Bhatti, Mountain View; Richard J. Friedrich, San Jose; Tai Jin, San Mateo; Anna M. Zara, Menlo Park, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/130,636

(22) Filed: Aug. 6, 1998

(51) Int. Cl.[7] .............................. G06F 15/16; H04L 12/28
(52) U.S. Cl. .................... 709/227; 709/227; 709/228; 709/229; 370/395; 370/431
(58) Field of Search ................................... 709/201–203, 709/226–227, 207, 228–229; 370/395, 431

(56) References Cited

U.S. PATENT DOCUMENTS 5,917,822 * 6/1999 Lyles ..................................... 370/395
6,006,264 * 12/1999 Colby et al. ......................... 709/226
6,154,769 * 11/2000 Cherkasova et al. ............... 709/207

* cited by examiner

Primary Examiner—Krisna Lim
Assistant Examiner—Hieu Le
(74) Attorney, Agent, or Firm—Thomas X. Li (57) ABSTRACT

A data service system is accessible through a plurality of access requests. The data service system includes a user access request classification system for classifying the access requests. The user access request classification system includes a request classifier that classifies each of the access requests into one of a plurality of classes based on a predetermined classification policy. The user access request classification system also includes a plurality of buffers coupled to the request classifier. Each buffer corresponds to one of the classes to receive the access requests classified by the request classifier as belonging to that class such that the data service system processes the access requests in accordance with their classes. A method of classifying user access requests for the data service system is also described.

6 Claims, 5 Drawing Sheets

METHOD AND SYSTEMS FOR ALLOWING DATA SERVICE SYSTEM TO PROVIDE CLASS-BASED SERVICES TO ITS USERS

BACKGROUND OF THE INVENTION

1. Field of the Invention

The present invention pertains to data access network systems. More particularly, this invention relates to a system and method for allowing a data service system within a data access network system to classify user access requests such that the data service system can provide class-based services to its users.

2. Description of the Related Art

An example of a data access network system is an Internet/Intranet network system. An Internet/Intranet network system typically includes a data service system and an interconnect network that connects the data service system to subscriber or user terminals or to other data service systems. The data service system is typically referred to as an Internet/Intranet Service Provider (ISP) system. The ISP system can host a number of content sites. The ISP system can also be connected to other ISP systems via an interconnect network, thus forming the Internet/Intranet network system. The users connected to the ISP system can access the content sites within the ISP system or the content sites within the other ISP systems via the network.

An ISP system typically includes web and/or content servers that host contents for various customers or applications. The customers are the owners of the contents hosted in the ISP system such that subscribers or users can access the contents via their computer terminals. The content servers typically utilize Internet applications, such as electronic mail, bulletin boards, news groups, and World Wide Web access. The hosted contents are arranged in the form of content sites within the content servers. Each site may include a number of pages (e.g., world wide web pages). A content site is typically for one customer while a particular customer may own a number of content sites.

Disadvantages are associated with this prior approach. One disadvantage is that the ISP system is not equipped to give different processing treatments to the users accessing a web site within the ISP system. As is known, the ISP system can be accessed by multiple users to a single web site at the same time. The ISP system typically handles the user access requests for that web site in the first-come-first-served (FIFO) fashion. This means that all of the users of the ISP system receive the same and equal treatment and no preferential treatment is allowed for any class of users. As a result, the ISP system does not support class-based service which allows access requests for the same content site to receive different processing treatments.

SUMMARY OF THE INVENTION

One feature of the present invention is to allow a data service system to provide different treatments to the users of the data service system.

Another feature of the present invention is to allow a data service system to control when an access request will be accepted for processing or rejected by the data service system.

A further feature of the present invention is to allow a data service system to prioritize access requests into classes such that preferential treatments can be given to some of the users accessing the data service system.

A still further feature of the present invention is to allow a data service system to provide a class-based service server.

A data service system includes at least one content site that is accessible through a plurality of access requests. The data service system includes a user access request classification system. The user access request classification system includes a request classifier that classifies each of the access requests into one of a plurality of classes based on a predetermined classification policy. The user access request classification system also includes a plurality of buffers coupled to the request classifier. Each buffer corresponds to one of the classes to receive the access requests classified by the request classifier as belonging to that class such that the data service system processes the access requests in accordance with their classes.

A method of classifying user access requests for a content site in a data service system is also described. The method includes the step of classifying each of the access requests into one of a plurality of classes based on a predetermined classification policy. The access requests belonging to each of the classes are then stored in a corresponding buffer such that the data service system processes all the access requests in accordance with their classes. The data service system includes a plurality of buffers, each corresponding to one of the classes specified by the classification policy.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
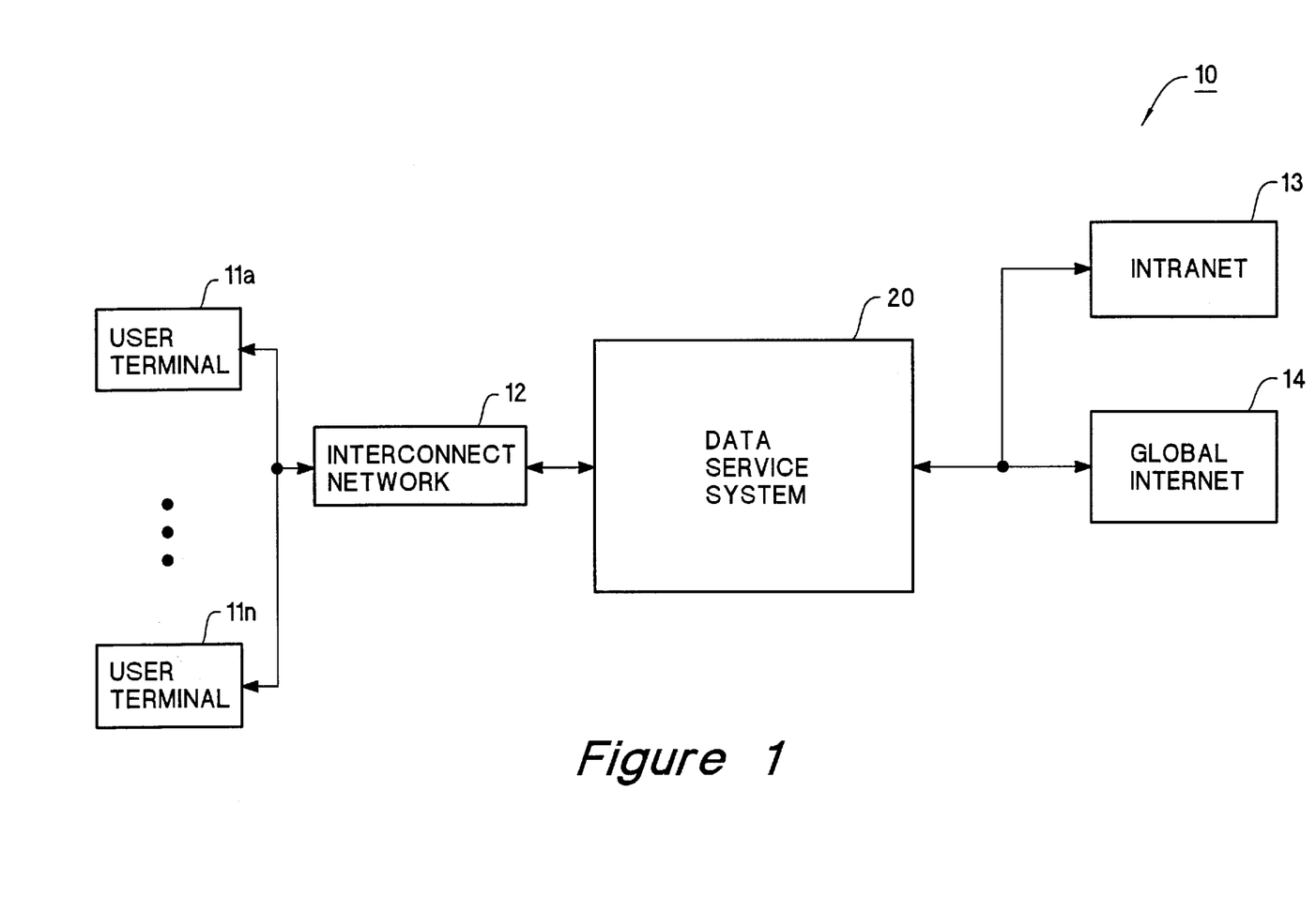
FIG. 1 shows a data access network system that includes a data service system that implements one embodiment of the present invention.

FIG. 1 shows a data access network system 10 that includes a data service system 20 that implements one embodiment of the present invention. The data service system 20 can be employed, for example, by an Internet/Intranet Service Provider (ISP) to offer data services (e.g., web, news, or advertisement) and other services (e.g., e-commerce and e-mail) to users or subscribers connected to the data service system 20.

As will be described in more detail below, the data service system 20 includes at least one access request classification system (i.e., the system 100 in FIG. 4) that implements one embodiment of the present invention. The access processing system 100 classifies the access requests for a content site located in a server of the data service system 20 such that preferential treatments can be provided for these access requests. The server can be a TCP-based server or a server that is based on other transmission protocols. TCP stands for Transmission Control Protocol. A TCP-based server is the server that can handle classifiable requests. A TCP-based server typically contains a number of content sites. A content site refers to a collection of data (e.g., a database or file system) that contain a set of content data and/or applications for access. The content sites can be accessed by multiple users at the same time. Alternatively, the access request classification system 100 classifies the access requests to any kind of services provided by the data service system 20.

In accordance with one embodiment of the present invention, the access request classification system 100 classifies the user access requests for a content site into a number of classes based on a predetermined classification policy. The predetermined classification policy may be based on the unique sender address of each of the access requests, or the tag information contained in each of the access requests (e.g., cookie, pathname in the host address, or browser plug-in value). Alternatively, the classification policy may be based on other categories. The access request classification system 100 then stores each class of access requests into a corresponding buffer. The number of buffers in the access request system 100 corresponds to the number of classes specified by the classification policy. The buffers may be queues in one embodiment.

The access request classification system 100 can also reject requests. This means that the access request classification system 100 may refuse to classify one or more access requests received. One reason for the rejection is to handle potential overload conditions. The other reason is to provide better performance. The rejection is based on a predetermined rejection policy which can be based on total number of waiting requests already in the access request classification system 100 and/or the number of waiting requests already in the top or higher classes. In addition, the rejection policy can be also be based on queue length, response time, or any kind of server load metrics such as CPU utilization or file system activity. Requests that are rejected are not placed in any queue since they will not be processed. In one embodiment, the access request classification system 100 includes a rejecter (i.e., the rejecter 220 in FIG. 5) that denies the processing of the classified access requests in accordance with a predetermined rejection policy. In another embodiment, the classified access requests do not pass through a rejecter.

The access request system 100 then schedules the classified access requests for processing based on a predetermined scheduling policy. The predetermined scheduling policy may be selected from a priority scheduling, a Round robin fair scheduling, a throughput metric scheduling, a session throughput scheduling, a bandwidth metric scheduling, a response time metric scheduling, an error rate metric scheduling, and a combination thereof. Alternatively, other scheduling schemes may be used as the scheduling policy.

In performing the above mentioned functions, the user access request classification system 100 allows the data service system 20 to provide preferential treatments to various users that are accessing a content site within the data service system 20. As a result, the data service system 20 provides a class-based service content site to its users. This means that the user access request classification system 100 allows the data service system 20 to prioritize access requests into classes such that preferential treatments can be given to some of the users accessing the data service system. In addition, the user access request classification system 100 allows the data service system 20 to control when an access request will be accepted and processed. The user access request classification system 100 will be described in more detail below, also in conjunction with FIGS. 1–4.

Referring now to FIG. 1, the data access network system 10 includes a global Intenet 14 and an Intranet 13 connected to the data service system 20. Each of the global Internet 14 and Intranet 13 includes a number of data service systems connected together via a network. Data communications among all the data service systems (including the data service system 20) are conducted using a predetermined open standard communication protocol for Internet/Intranet communications. In one embodiment, the open standard communication protocol is the Hyper Text Transport Protocol (i.e., HTTP). Alternatively, other known communication protocols for Internet/Intranet communications can also be used. Each of the data service systems in the Intranet 13 and Internet 14 has substantially the same functional structure as the data service system 20 although the physical configuration of these data service systems may be different from the data service system 20 and from each other.

The data service system 20 is connected to a number of user terminals 11a through 11n via an interconnect network 12. Each of the user terminals 11a–11n can access the data service system 20 or other data service systems in the global Internet 14 or Intranet 13 via the interconnect network 12. The interconnect network 12 can be any known network, such as Ethernet, ISDN (Integrated Services Digital Network), T-1 or T-3 link, FDDI (Fiber Distributed Data Network), cable or wireless LMDS network, or telephone line network.

Each of the user terminals 11a–11n may be at a residence, a school, or an office of the user. Each of the user terminals 11a–11n may include a web browser application program (or an e-mail or e-commerce application program) that allows the user access to the data services offered by the data service system 20 or other data service systems in the global Internet 14 or Intranet 13.

Each of the user terminals 11a–11n can be, for example, a personal computer, a network computer, a notebook computer, a workstation, mainframe computer, a supercomputer. Alternatively, each of the user terminals 11a–11n can be any other electronic system with data processing capabilities. For example, a web TV may be used for one or each of the user terminals 11a–11n. In addition, each of the user terminals 11a–11n may include a modem or network adaptor, depending on the network technology adopted for the interconnect network 12.

Figure 2:
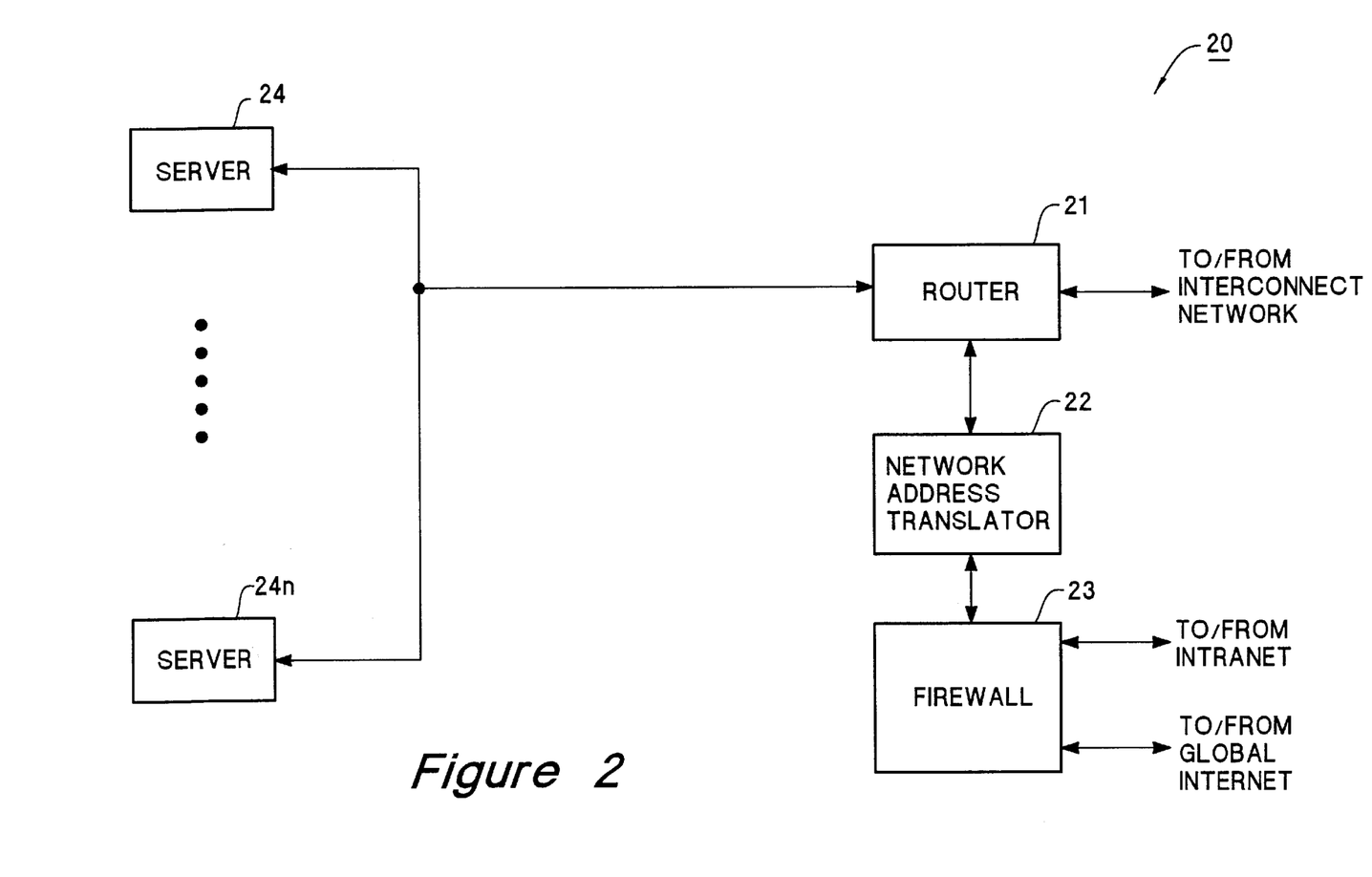
FIG. 2 shows the structure of data service system that includes a number of servers.

The data service system 20 provides data access services contracted by its customers to its users (e.g., at the user terminals 11a–11n in and/or from the global Internet 14 or Intranet 13). The data services offered by the data service system 20 can be, for example, web, news, e-mail, e-commerce, advertisement, or other types of data services. Here, a customer means the entity contracting with the data service system 20 to have its content hosted in the data service system 20, or to have its services (e.g., e-commerce, e-mail, or news group) offered through the data service system 20. A user means the entity accessing one or more of the content sites hosted in the data service system 20. FIG. 2 shows the functional or logical structure of the data service system 20, which will also be described in more detail below.

Referring to FIG. 2, the data service system 20 includes a number of servers 24 through 24n, a router 21, a network address translator 22, and a firewall 23. The router 21 is used for routing data to and from various modules within the data service system 20. The router 21 functions to connect the remote user terminals (e.g., the terminal 11a) to the appropriate servers 24–24n, or to the global Internet 14 or Intranet 13 via the firewall 23.

The network address translator 22 translates between a "private" address and a "public" address. The "private" address is used for a user to access the servers 24–24n within the data service system 20 and the "public" address is used for the user to access web sites in the global Internet 14 and Intranet 13. In cases where subscriber terminals are assigned "public" addresses directly, the system 20 does not include the network address translator 22.

The firewall 23 controls access to and from the system 20 from the global Internet 14 and Intranet 13. The Firewall 23 may be implemented in hardware or software and are included to enhance security of the system 20.

The servers 24–24n may include web content servers, e-mail servers, news servers, e-commerce servers, domain name servers (DNSs), address assignment servers (e.g., Dynamic Host Configuration Protocol servers), proxy servers, subscription management servers, advertisement servers, and session manager servers. In addition, the servers 24–24n may include other servers. The web content servers, e-mail servers, news servers, e-commerce servers, and advertisement servers can be collectively referred to as local service servers.

The local service servers store contents that include Hyper-Text Markup Language (HTML) web pages, database objects, gif images, video clips, etc. Data transfers to and from the local service servers are enabled by network transport protocols such as Transport Control Protocol (TCP) and the User Datagram Protocol (UDP). The local service servers support a variety of Internet applications to provide services such as access to the World Wide Web, electronic mail, bulletin boards, chat rooms, and news groups. Using web browser and other client applications, users can access Web pages, news, and e-mail stored in the local service servers via their terminals. In addition, the users can also access Web pages located at remote sites of the global Internet 14 or Intranet 13.

The address assignment servers assign an address to a user terminal when it first accesses the data service system 20. Specialized address assignment protocols such as Dynamic Host Configuration Protocol (DHCP) are used by the address assignment servers to assign addresses to user terminals. The proxy servers may be used to enhance security of accesses to and from the user terminals (e.g., the terminal 11n), as well as to speed up Internet access by caching frequently accessed data locally.

The DNS servers provide mapping between host names and network addresses. This process is referred to as name resolution. Before accessing a web content server, the user's web browser application first contacts one of the DNS servers to find out the network address of the web content server. If the resolution fails, the web transfer is aborted.

Figure 3:
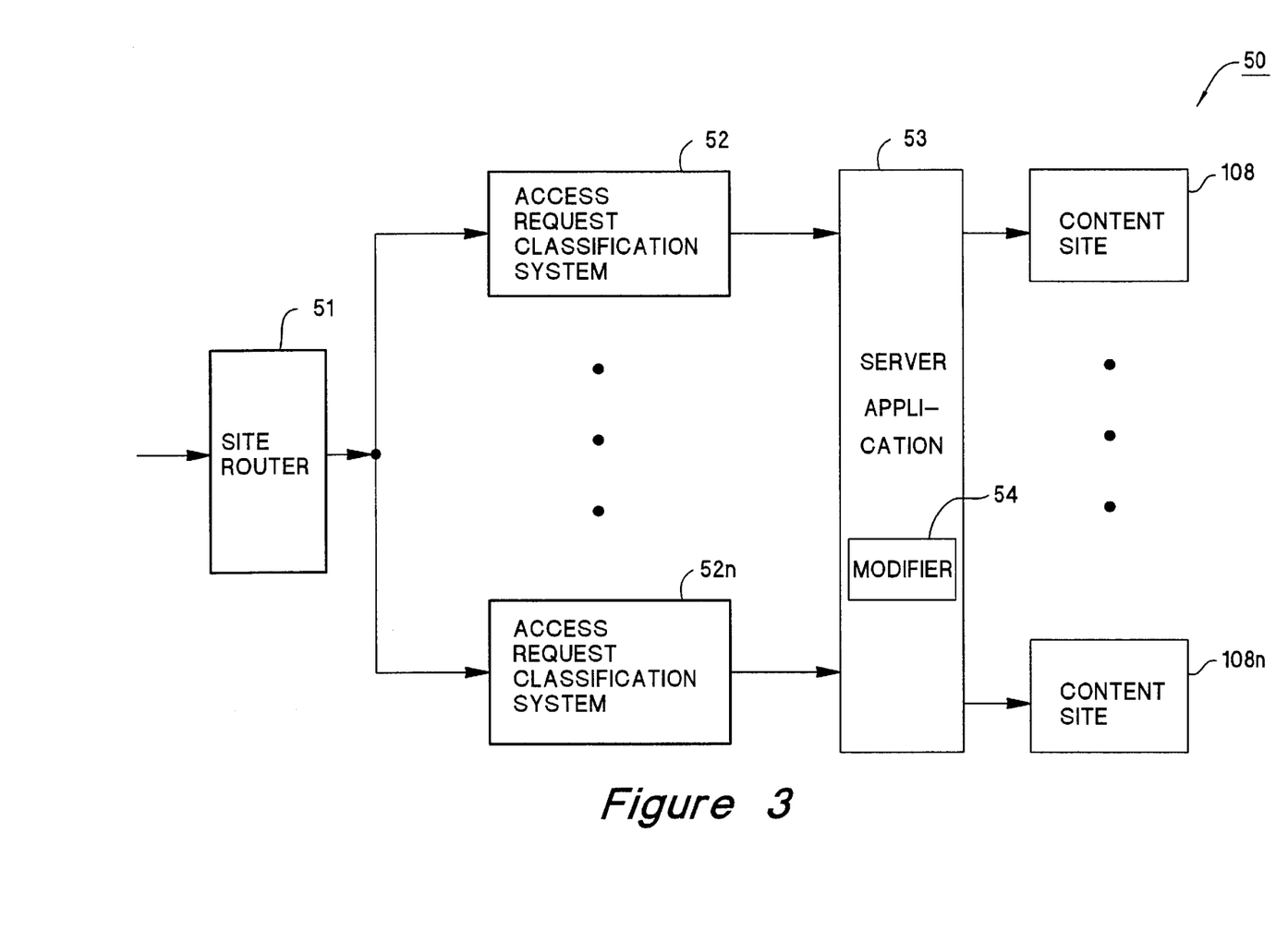
FIG. 3 shows the logical structure of one of the servers of FIG. 2, wherein the server includes a number of access request classification systems for the content sites within the server in accordance with one embodiment of the present invention.

Each of the servers 24–24n can be a TCP-based (or based on other transmission protocols) server or a non-TCP-based server. A TCP-based server can handle classifiable access requests for the content hosted in the server. An example of a TCP-based server is a web content server, an e-mail server, a news server, an e-commerce server, a local service server, a domain name server, and a proxy server. An example of a non-TCP-based server is an address assignment server. Each TCP-based server of the servers 24–24n includes a number of content sites (i.e., databases) that can be accessed via access requests. If a TCP-based server is a web server, then the content sites are world wide web sites, each of which contains a number of world wide web pages. FIG. 3 shows the structure of a TCP-based server 50 which can be any one of the TCP-based servers of the servers 24–24n.

Referring to FIG. 3, the server 50 includes a number of content sites 108 through 108n and a number of access request classification systems 52 through 52n. Each of the content sites 108–108n is constructed using the known Internet technology. The content sites 108–108n are run and managed by a server application 53 that executes processes or threads to provide access to the content sites 108–108n. The server application 53 can be any known server application program and will not be described in more detail below. When the content sites 108–108n are world wide web sites, the server application 53 is a world wide web server application.

Figure 4:
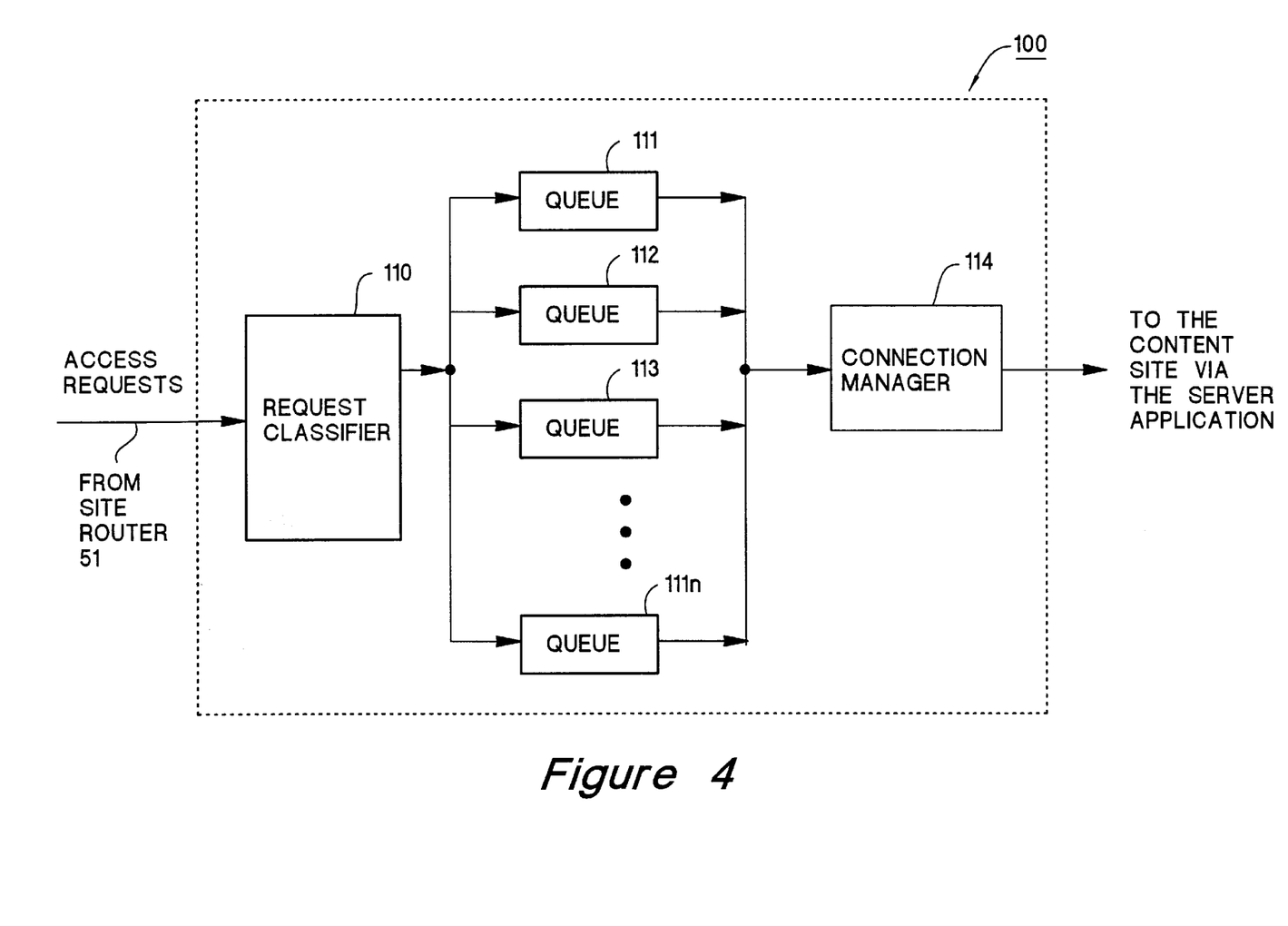
FIG. 4 shows the logical structure of the access request classification systems shown in FIG. 3.

Each of the access request classification systems 52–52n is used for one of the content sites 108–108n. For example, the access request classification system 52 is for the content site 108 and the access request classification system 52n is for the content site 108n. The access request classification systems 52–52n are connected to their corresponding content sites 108–108n via the server application 53. Each access request classification system is used to classify the access requests for its corresponding content site such that preferential treatments may be provided for some of the access requests accessing that content site. This allows the server 50 to provide class-based services to its users. The class-based services server 50 allows multiple classes of users to share the same content site (i.e., the same URL address) and yet receive different treatments or performance. Class-based service is a mechanism for differentiating services given to individual classes. Thus, service performance can be priced based on performance or service agreements. A higher class with greater guarantee can be priced higher than a lower class that may offer less guarantee and more "best effort" services. class-based services provide tiered performances to match tiered pricing. Each tier or class may have targets or expectations for performance. Each of the access request classification systems 52–52n performs substantially the same function. The structure of each of the access request classification systems 52–52n is shown in FIG. 4, which will be described in more detail below.

Referring again to FIG. 3, the server 50 also includes a site router 51 that routes the access requests to their appropriate content sites. This means that if an access request received in the site router 51 is for the content site 108, the site router 51 sends the access request to the access request classification system 52. If an access request is determined in the site router 51 to be directed to the content site 108n, then the site router 51 sends that access request to the access request classification system 52n. Alternatively, the server 50 does not include the site router 51. In this case, each of the access request classification systems 52–52n includes the function of determining whether a received access request is directed to its corresponding content site.

Each of the access request classification systems 52–52n can be implemented by hardware, software, or firmware. In one embodiment, each of the access request classification systems 52–52n is implemented by software. In this case, each of the access request classification systems 52–52n can be implemented independent of the server application 53. For example, this can be done by replacing the existing Unix socket library of the server application 53 with a modified socket library for the access request systems 52–52n that implements classification, rejection, and buffering.

The above implementation means that each of the access request classification systems 52–52n is transparent to the server application 53 and is not integrated into the application. The advantage of this approach is that no modification to the existing server applications is required and each of the systems 52–52n can work with generic, off-the-shelf server infrastructure software (assuming the software is built with some type of dynamic linking). In addition, no specialized low level hardware or software support is required. Thus, the transparent approach allows the access request classification systems 52–52n to have wide applicability in a heterogeneous or multi-tier or class environment. Alternatively, the properties and functions of each of the access request classification systems 52–52n may be integrated into the server application 53. In this case, modification of the existing applications to incorporate the functions is required.

In addition, the server application 53 may also include a modifier 54. The modifier 54 is used to mark the process or thread that executes the request received by the server application 53 from one of the access request classification systems 52–52n. The modifier 54 marks the process or thread with a priority that corresponds to the importance of the request to be processed. The modifier 54 can be implemented by known technology. For example, the modifier 54 can be implemented using the HP PRM (Process Resource Management) technology available from Hewlett-Packard Co. of Palo Alto, Calif. Another example of implementing the modifier 54 is using the known Unix based NICE technology.

Referring now to FIG. 4, the functional structure of an access request classification system 100 is shown. The access request classification system 100 can be any one of the access request classification systems 52–52n of FIG. 3. The access request classification system 100 includes a request classifier 110, a number of queues 111 through 111n, and a connection manager 114. The request classifier 110 classifies the access requests received into various classes. The request classifier 110 does this in accordance with a predetermined classification policy, which will be described in more detail below. The classification policy also specifies the number of classes for the access requests.

The classification policy may allow classification of the access requests received in the request classifier 110 based on one of a number of criteria. For example, the classification policy can be based on the unique sender IP (Internet Protocol) address of each of the user access requests. As is known, each user terminal has a unique sender IP address which identifies the user when sending an access request. This IP address can be used to classify the user access requests received in the classifier 110. In this case, the classification policy provides a list of sender IP addresses for a class. For example, the policy may specify a list of sender IP addresses as belonging to a first class (e.g., primary class) and another list of sender IP addresses as belonging to a second class (e.g., secondary class). A lookup table or hash table can be created that specifies which sender IP address belongs to which class.

As an another example, the classification policy can be based on a tag value contained in each of the access requests. The tag value can be a cookie or a browser plug-in value. A particular cookie is typically sent from a content site to the user terminal when the user first accesses that content site. After that, the cookie is attached to any access request accessing the content site from that user terminal. More specifically, a cookie allows a content site (especially a world wide web site) to deliver data to a user, request that the user store the data, and return the data to the content site whenever the user accesses the content site. A browser plug-in value is a unique value generated from a particular web browser. This means that each web browser generates its own unique browser plug-in value. The browser plug-in values allow the content site to recognize the user terminals from which the access requests are generated. When cookies are used, the classification policy may specify which cookies belong to what class. One or more cookies can belong to one class. This is similar to the sender IP address scheme. When browser plug-in values are used, the classification policy may specify which plug-in values belong to what class. One or more plug-in values may belong to one class. This is also similar to the sender IP address scheme.

The cookies can be created when users of a content site subscribe to the services provided by the content site. In this case, the cookies identify to which class a particular user is subscribed (e.g., flat fee class or pay-per-use class). Then the cookie is sent back to the content site with the access request to identify the class to which the user belongs whenever the user is accessing the content site.

Moreover, the classification policy may be based on the contents accessed. This can be done using pathnames contained in access requests. As is known, the URL address of an access request typically includes a host address and a pathname. The pathname is used to access a particular page (or a portion of data) within that content site. This is important because in this case, the data service system 20 can treat some content more important than other content.

The classified access requests from the request classifier 110 are then stored in the corresponding queues 111–111n. Each of the queues 111–111n corresponds to one of the classes specified by the predetermined classification policy. These queues 111–111n are buffers or storage means for storing the classified access requests so that they can be accepted by the connection manager 114 for processing in accordance with a predetermined scheduling policy. The connection manager 114 is used to determine which access request in which queue is to be accepted next for processing based on the predetermined scheduling policy. The scheduling policy specifies criteria or guidelines for the connection manager 114 to decide which of the queues 111–111n should be serviced next, and thus which request will be passed next to the server application 53. The scheduling policy will be described in more detail below.

In one embodiment, each of the queues 111–111n queues the classified access requests it receives. In another embodiment, each of the queues 111–111n is simply a buffer or storage means that stores the classified access requests it receives.

As described above, the scheduling policy may be selected from a number of known scheduling policies. They may include, for example, a priority scheduling, a Round robin fair scheduling, a bandwidth metric scheduling, a response time metric scheduling, an error rate metric scheduling, and a combination thereof. Alternatively, other known scheduling policies may be used. For example, the scheduling policy may specify a number of processes in the server application 53 (FIG. 3) to exclusively support the higher classes and another number of processes in the server application 53 that can service any request in any one of the queues 111–111n. Moreover, the scheduling policy may be a two-tier or class scheduling policy which includes a first sub-policy that specifies which of the queues 111–111n should be first serviced and a second sub-policy that specifies which request in the queue should be first serviced. In this case, each queue has its own metrics for scheduling.

A simple priority scheduling scheme allows all the access requests in the first-class queue to be processed before moving to process the access requests stored in the second-class queue. Alternatively, the priority scheduling policy can be modified to start processing the access requests stored in the second-class queue if the number of access requests stored in the first-class queue (i.e., queue length) is less than a predetermined threshold.

The Round robin fair scheduling allows the connection manager 114 to service all of the queues 111–111n at the same rate. A modification of the scheduling can be made to allow various weighted rates for different queues.

The bandwidth metric scheduling policy schedules the access requests based on their data transfer rates. If an access request requires the least amount of data transfer (i.e., the least data bandwidth), the access request is processed first (or last). In addition, the bandwidth metric scheduling policy can also specify a set of tiered bandwidth thresholds (e.g., 1, 2, or 4 Mb/sec). The request or requests with their bandwidth requirements meeting the first threshold get processed first while the request or requests meeting the second bandwidth thresholds get processed next.

The response time metric scheduling sets the metric based on the response time of the access requests. For example, an access request may require a response time of 2 seconds (i.e., reply within 2 seconds) while another access request may require a response time of 5 seconds. Thus the response time metric scheduling policy may determine which of the waiting requests has the shortest response time, and processes that request first. The response time scheduling may also schedule the access requests based on the response latencies of the waiting access requests. The error rate metric scheduling is also a known scheduling method, which will not be described in more detail below.

There can also be a mixture of scheduling metrics for the queues 111–111n. For example, the queue 111 can be measured by the metric of bandwidth while the queue 112 can be measured by the metric of response time.

Figure 5:
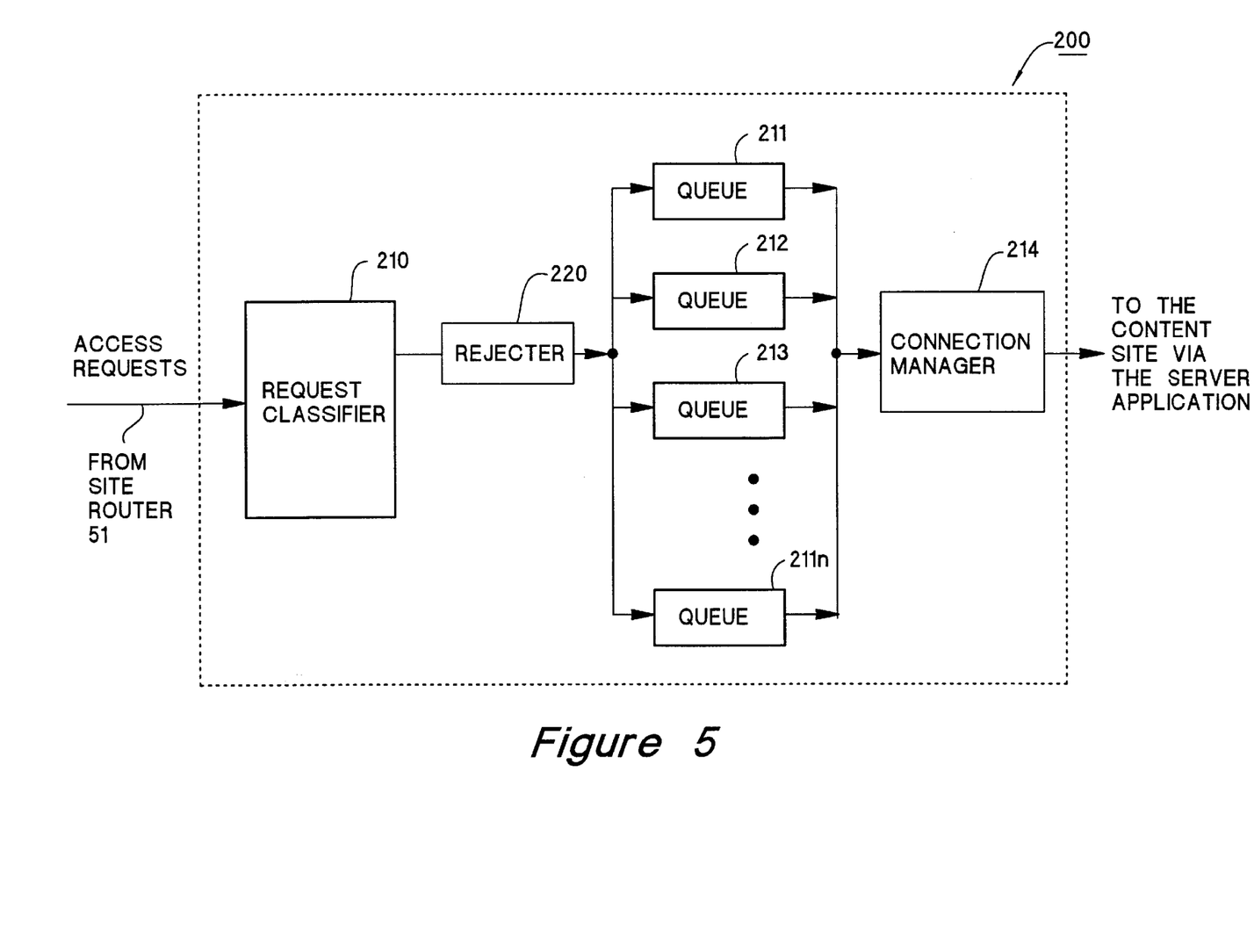
FIG. 5 shows another logical structure of the access request classification systems of FIG. 3.

FIG. 5 shows the structure of another access request classification system 200 which can be any one of the access request classification systems 52–52n of FIG. 3. As can be seen from FIGS. 4 and 5, the structure and function of the access request classification system 200 are the same as those of the access request classification system 100, except that the access request classification system 200 further includes a rejecter 220 which allows the access request classification system 200 to reject access requests. As described above, one reason for the rejection function is to handle potential overload conditions within the server 50. The other reason is to provide better performance for the server 50. The rejecter 220 rejects classified access requests based on a predetermined rejection policy which can be based on total number of waiting requests already in the access request classification system 100 and/or the number of waiting requests already in the top or higher classes. In addition, the rejection policy can be also be based on queue length, response time, or any kind of server load metrics such as CPU utilization or file system activity. Requests that are rejected are not placed in any queue since they will not be processed.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. In a data service system that includes a content site accessible through a plurality of access requests, a user access request classification system for classifying the access requests, comprising:

a request classifier that classifies each of the access requests into one of a plurality of classes based on a predetermined classification policy;

a plurality of buffers outside the request classifier but coupled to the request classifier, each for one of the classes in order to receive the access requests classified by the request classifier as belonging to that class such that the data service system processes the access requests in accordance with their classes;

a rejecter outside the request classifier but coupled between the request classifier and the buffers to reject the classified access requests based on a predetermined rejection policy, wherein the request classifier, the buffers, and the rejecter are part of and reside within the data service system.

2. The user access request classification system of claim 1, wherein the predetermined classification policy allows classification of the access requests based on the sender addresses of the access requests.

3. The user access request classification system of claim 1, wherein the predetermined classification policy allows classification of the access requests based on a tag contained in each of the access requests, a cookie, or a browser plug-in value.

4. The user access request classification system of claim 1, wherein the predetermined classification policy allows classification of the access requests based on a pathname or a URL locator.

5. The user access request classification system of claim 1, further comprising a connection manager that determines which one of the access requests from which one of the buffers is to be processed in accordance with a predetermined scheduling policy.

6. The user access request classification system of claim 5, wherein the predetermined scheduling policy is selected from a group comprising a priority scheduling, a Round robin fair scheduling, a bandwidth metric scheduling, a throughput metric scheduling, a response time metric scheduling, and an error rate metric scheduling.

* * * * *